United States Patent [19]

Hörhold et al.

[11] 4,308,085

[45] Dec. 29, 1981

[54] PROCESS FOR THE PREPARATION OF HIGH MOLECULAR THERMOPLASTIC EPOXIDE-AMINE-POLYADDUCTS

[75] Inventors: Hans-Heinrich Hörhold, Jena-Lobeda; Dieter Klemm, Weimar; Klaus Bellstedt, Jena; Ludwig Haase, Apolda; Joachim Klee, Jena; Klaus Schubert, Jena; Helmut Wachs, Jena; Rolf Märtin, Jena-Winzerla, all of German Democratic Rep.

[73] Assignee: Jenoptik Jena GmbH, Jena, German Democratic Rep.

[21] Appl. No.: 172,598

[22] Filed: Jul. 28, 1980

[51] Int. Cl.³ .................. C08G 59/50; C08G 65/26
[52] U.S. Cl. .................................. 156/330; 528/111; 528/116; 528/121; 528/122; 528/124; 528/407
[58] Field of Search ............... 528/111, 116, 121, 122, 528/124, 407; 156/330

[56] References Cited

U.S. PATENT DOCUMENTS

| | | | |
|---|---|---|---|
| 3,317,471 | 5/1967 | Johnson et al. | 528/124 X |
| 3,554,956 | 1/1971 | Jones | 528/118 X |
| 3,580,887 | 5/1971 | Hubin | 528/407 X |
| 3,592,946 | 7/1971 | Griffith | 528/121 |

*Primary Examiner*—Earl A. Nielsen
*Attorney, Agent, or Firm*—Jordan and Hamburg

[57] ABSTRACT

High molecular linear, thermoplastic, epoxide-amine-adducts containing the structural segment

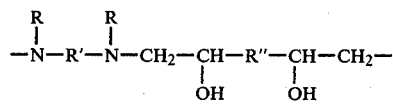

are prepared by a solvent-free reaction of equivalent amounts at 20 to 200° C. of N,N'-bis(aralkyl) diamines (for example, N,N'-dibenzyl-ethylenediamine, N,N'-dibenzyl-p-xylylenediamine, N,N'-dibenzyl-4,4'-diamino-diphenylmethane, N,N'-dibenzyl-3,6-dioxa-octanediamine-1,8) with diepoxides (for example, 2,2-bis(4-glycidyloxyphenyl)propane). The polyadducts are soluble and may be processed by thermoplastic methods. The polyaddition process may be conducted for the forming of shaped objects in a form-shaping vessel, for the production of coatings directly upon the surface to be coated and also in the presence of inserted materials and has, due to these characteristics, the nature of a casting system.

12 Claims, No Drawings

PROCESS FOR THE PREPARATION OF HIGH MOLECULAR THERMOPLASTIC EPOXIDE-AMINE-POLYADDUCTS

FIELD OF USE OF THE INVENTION

The invention relates to a method of preparing high molecular thermoplastic epoxide-amine-polyadducts containing as polyhydroxylpolyamine-compounds the following characteristic structural segment:

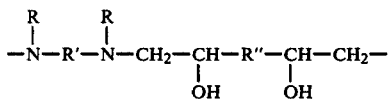

High molecular polymers of this kind, possess as do three-dimensionally-crosslinked epoxide-amine-polyadducts, high mechanical stability, good electrical properties and good adhesion, all properties which allow manifold uses for molded goods, adhesives, lacquers, coatings, films, for embedding and insulating electronic components, as a laminating agent or a casting resin and many other purposes.

Due to their thermoplasticity and solubility, the epoxide-amine-polyadducts according to the invention are even more all-encompassing and more advantageous in their technological uses than the three-dimensionally-crosslinked epoxide-amine-polyadducts and are particularly useful for the production of films and fibers from melts or solutions and also for casting, extrusion, pressing and drawing.

CHARACTERISTICS OF KNOWN PRIOR ART

While polymeric lattices consisting of epoxide resins and polyamines are well researched and are being used in many technical applications, the polyaddition of diepoxides to disecondary diamines yielding unbranched and uncrosslinked polyadducts of the aforegiven structure was obtained up to now in exceptional cases only (related to R, R' and R") and under specific processing conditions, usually by reacting in appropriate solvents. Hereinbelow, "DRP" means Federal Republic of Germany Pat. no., "USP" means U.S. Pat. No., "DDR" means German Democratic Republic and preceded by "WP" means application.

DRP Pat. No. 676,117 already teaches how to prepare addition products of impure diepoxides and various disecondary diamines in solvents containing hydroxyl groups. According to the disclosure, these are resinous products, which are neither high molecular products nor can they be called thermoplastic according to the specific terminology of high molecular materials. Furthermore, it is obvious that the respective addition products may be produced only by reaction in a solvent and that such a method makes the preparation of castable products impossible.

Later appearing literature concurs that the synthesis of non-crosslinked polyadducts in the absence of solvents is a subject presenting large difficulties (Methoden der Organischen Chemie (Houben-Weyl), vol. XIV/2, page 499, Georg Thieme Publishers, Stuttgart 1971; K. Jellinek, II. Internat. Tagung ueber glasfaserverstaerkte Kunststoffe und Giessharze, Berlin, Mar. 13 to 18, 1967). That seems to be caused by the catalytic action of the tertiary amine groupings upon the ring opening polymerization of the epoxide groups which should be excluded here or because the hydroxyl groups arising here interfere with the reaction. Particularly the partial polymerization of the epoxide, which is so undesirable, would cause a disturbance of the molar equivalency of the components of the polyaddition system and would also cause crosslinking. Therefore, it was up to now not possible, particularly due to the high tendency of the epoxide groups to homopolymerization, to create high molecular non-crosslinked casting resins similar to the systems leading to polyurethane thermoplastics. That forced the experts to find other methods for the solution of the technical demands, for instance in order to obtain flexibilization and toughening. On the other hand, in cases where solubility, thermoplasticity or meltability are demanded, oligomers had to be used, where the known disadvantages, due to the low molecular weight (brittleness, structural weakness) had to be taken in the bargain or had to be cured by additional reactions.

Experiments to prepare high molecular, thermoplastic and non-crosslinked epoxide-amine-adducts were frequently undertaken. Makromolekulare Chemie 116, 158–172 (1968) describes the polyaddition of N,N'-bis(2,3-epoxy-propyl)piperazine (analogous to DRP Pat. No. 676,117 (example 2)) with primary aliphatic and aromatic amines and with aliphatic, aromatic and cycloaliphatic, heterocyclical disecondary diamines. The polyreaction is again executed in solvents and leads to low molecular products, having relative molecular weights of 2000 to 6900. Piperazine and N,N'-dialkyl-substituted aliphatic diamines react with 2,2'bis(4-glycidyloxyphenyl)propane in dilute solutions yielding oligocycles and not high molecular polymers (S. Ore, O. G. Tjugum, Acta chim. Scand. 24, 2397 (1970)). It is within the state of the art (U.S. Pat. No. 3,554,956) to prepare thermoplastic polyhydroxyl-polyamine-compounds by mixing an epoxide compound with terminal 1,2 epoxide groups and a disecondary diamine at a molecular ratio 0.9–1.1:1, said mixture containing an inert dilution agent as an essential component. It is exceedingly disadvantageous and severely restricting that this synthesis can only be performed in the presence of the aforementioned dilution agent. As shown in example 1 of the patent, the absence of a dilution agent causes the appearance of nonmelting products, useless as thermoplastics. High molecular thermoplastic casting systems or similar compounds cannot be prepared by this method and the present state of the art does not generally allow the preparation of high molecular thermoplastic polyadducts by using disecondary amines.

Furthermore, it is known that the special case of the reaction of N,N'-dimethylethylenediamine with resorcinol-diglycidylether leads to a soluble polyadducts (U.S. Pat. No. 3,592,946). The disadvantages of this method are that it applies to one special case only, that many elastomeric, non-thermoplastic by-products occur and that the reaction of the aforementioned disecondary diamine with the resorcinol-diglycidylether occurs very rapidly so that the control of the reaction becomes very complicated. Furthermore, the high volatility and the $CO_2$-sensitivity of the amine cause considerable technical difficulties in the preservation of the stoichiometry of the reaction partners.

It was furthermore proposed to prepare optical adhesives for the low-strain glueing of optical parts, hardening at room temperature and separable in the temperature range of 120° to 200° C., based upon unmodified, low molecular epoxide resins, containing at least two epoxide groups per molecule and N,N'-dibenzyl-ethylenediamine (DDR Patent Application No. CO9J/202908) and also other disecondary diamines (WP-DDR Pat. No. 122,258, WP-DDR Pat. No. 130,580). Here, though, it was not the aim to prepare high molecular thermoplastic epoxide-polyadducts, so that these methods were not even aimed at solving the task of the present invention. The relative molecular weights of the polyadducts useful as optical adhesives lie generally below 6000, so that even hardened optical adhesives according to these patents will not have the properties which are so typical for the high molecular thermoplastic epoxide-amine-adducts and which make these polymers so valuable as raw materials. Some mechanical properties like impact resistance, resistance to tear, toughness are functions of the molecular weight; the desired properties of interest to industry are obtained in this special case only at $M_n > 8000$ values.

Several other epoxide-amine-hardening systems were proposed, using also secondary diamines but not leading to thermoplastic high molecular epoxide-amine-polyadducts and are thus not conducive to a solution of the present problem. They have generally the disadvantage that their hardening leads to insoluble, unmeltable crosslinked products (German Pat. No. 1019481, German Pat. No. 1038278, German Off. No. 2164099. Brit. Pat. No. 868,733).

OBJECT OF THE INVENTION

The object of the invention is to find a generally usable method for the preparation of high molecular ($M_n > 8000$) thermoplastic epoxide-amine-polyadducts without the use of diluents and where variation of the addition components leads to a broad gamut of polyadducts having various physical properties, where particularly thermoplastic materials with glass transition temperatures $T_g$ of 0° to 150° C. result.

DESCRIPTION OF THE INVENTION

It was surprising and not possible to foresee that high molecular thermoplastic epoxide-amine-polyadducts may be synthesized according to the invention as follows: a diepoxide, preferably a diglycidylether, e.g., 2,2'bis(4-glycidyloxyphenyl) propane, is reacted without solvent or diluent with a diamine of the structure DA

at a molar ratio 1.0:1.0 where R is an aralkyl, preferably a benzyl, and R' radical is a difunctional branched or unbranched hydrocarbon, either an alkylene, a cycloalkylene, an arylene or a difunctional heterocyclic compound, and where R' may be a mixed radical of these classes or also hetero-atoms (for instance O, S, N) or other respective radicals containing multiple bonds.

According to the invention, high molecular polyaddition-products are obtained when the molar ratio of the polyaddition-components lies between 0.95:1.0 and 1.0:1.05 (diepoxide:diamine) even when mixtures of diamines of the invention or mixtures of diepoxides of the invention are used.

The method may also be used in such a manner that the poly-addition process leads to the forming of shaped products directly in a form-shaping mold or to the development of coatings directly upon a surface to be coated. One can also produce adhesive bonds and gaskets directly between the parts to be bonded or gasketed, and it is possible to reinforce fibers, to produce combined materials or laminations by a direct polyaddition process.

Very well suited diepoxides for use in this invention are 2,2'-bis(4-glycidyloxy-phenyl)propane, bis(-glycidyl)-alkyl-ether or -arylether, bis(glycidyl)amine and similar compounds.

The process of the invention may, of course, be extended also for use with diepoxide-resins which contain a mixture of several diepoxides. Here a difficulty arises because admixtures containing one epoxide group only or more than two epoxide groups per molecule have to be excluded and also in the preservation of the equivalency of the partners of reaction. The optimal amount of diamine is here determined by the determination of the equivalent weight or by experimental trials.

The polyaddition according to the invention is realized in a simple manner by mixing well the equivalent amounts of diepoxide and disecondary amine and keeping them reacting, if needs be by heating, until the desired molecular weight (above 8000) is obtained. Depending on the radicals R and R', it is advantageous to keep the temperature of reaction between 20° and 200° C. It is practical to increase the temperature of reaction slowly to the glass transition temperature of the polyproducts, to keep it there for a prolonged time and finally to increase it to a point lying about 50° C. above $T_g$. The thermoplastic polyadducts according to the invention may be used by all techniques known for thermoplastic materials, like casting, extruding, injection molding, pressing, drawing. Instead of pure individual (single) components (diepoxide, diamine), also mixtures of the diamines and/or mixtures of various diepoxides may be used as long as the equivalency of the functional groups is maintained according to the invention. For instance, it is advantageous to use mixtures containing N,N'-dibenzyl derivatives of aromatic diamines in order to obtain polyadducts having glass transition temperatures above 80° C. As a considerable improvement following U.S. Pat. No. 3,554,956, it was found that the method according to the present invention allows, without incurring any problems, the forming of polyadducts without the addition of any diluents so that shaped bodies may be created, like casts, gaskets, pressed shapes or laminates or plane shapes like surface coatings or laminants. These epoxide-amine-polyadducts show, due to their non-crosslinked structure, other properties than the known crosslinked epoxide resins. They show, when used as surface coatings, adhesives, gaskets and as components of polymers in reinforced and filled materials and compositions, particularly lower inner tension or stress and less brittleness, which is, in comparison to the known epoxide-amine-crosslinked material, a considerable advantage because the danger of the occurrence of tension or stress cracks is reduced. Such cracks are a common cause of mechanical and electrical failures and are the cause of poor ageing characteristics. The method of this invention also allows the formation of fibers or films directly from a molten polyadduct.

The diepoxides used may be produced in known manner and also be purified by conventional methods like distillation, recrystallization or other methods.

The diamines according to the invention are produced according to known synthetic methods, for instance by the reaction of dichloro-compounds with benzylamine or by the reaction of diprimary diamines with benzaldehyde and subsequent hydrogenation of the Schiff-bases. Several disecondary diamines are already commercially produced (e.g., N,N'-dibenzylethylenediamine). Others were synthesized according to known methods (Makromol. Chem. 17, 77–130 (1955). Suitable disecondary diamines, having the structure DA are:

N,N'-dibenzylethylenediamine/R'=—CH$_2$—CH$_2$—/
N,N'-dibenzyltetramethylenediamine-1,4/R'=—(CH$_2$)$_4$—/
N,N'-dibenzylhexamethylenediamine-1,6/R'=—(CH$_2$)$_6$—/
N,N'dibenzyl-2,2,4(2,4,4)trimethyl-hexamethylenediamine-1,6/R'=—CH$_2$—C(CH$_3$)$_2$—CH$_2$—CH(CH$_3$)—CH$_2$—CH$_2$—/
N,N'-dibenzyl-3,6-dioxa-octanediamine-1,8/R'=—(CH$_2$—CH$_2$—O)$_2$—CH$_2$—CH$_2$—/
N,N'dibenzyl-p-xylylenediamine/R'=

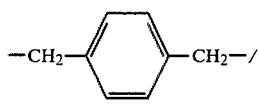

N,N'dibenzyl-2,7-bis(aminomethyl)-fluorene/R'=

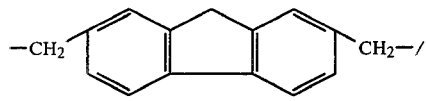

N,N'-dibenzyl-4,4'-diaminodiphenylmethane/R'=

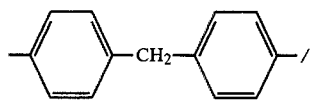

N,N'-dibenzyl-4,4'-diaminodicyclohexylmethane/R'=

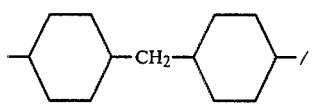

N,N'-dibenzyl-but-2-ene-diamine-1,4/R'=—CH$_2$—CH=CH—CH$_2$—/
N,N'-dibenzyl-2,5-bis(aminomethyl)thiophene/R'=

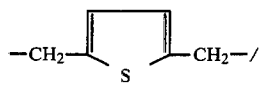

N,N'-diphenethylethylenediamine/R'=—CH$_2$—CH$_2$—/R=C$_6$H$_5$—CH$_2$—CH$_2$—
N,N'-dibenzyl-1-phenylethylenediamine/R'=CH(C$_6$H$_5$)—CH$_2$—/

Observing that the process of this invention does not lead to a crosslinked polyadduct, it is justified to call it surprising that N,N'-dimethylbenzylamine catalyzes as is well known crosslinking of epoxides while being structurally quite analogous to the nitrogen-containing polymer-chains of the present invention. According to the invention, the N,N'-dibenzyldiamines particularly are the most preferred addition partners for the preparation of non-crosslinked high molecular polyadducts. Extensive experiments showed that various substituents R, which did not belong to the aralkyl-species, caused crosslinking or lead to low molecular polyadducts only.

Furthermore, it is most important, for the end uses of this invention, that the volume contraction after the addition of, e.g., 2,2-bis(4-glycidyl-oxyphenyl)propane to the disecondary diamines DA of the invention is smaller than 5% (3–5%) of the volume of the mixture of the monomers. By adding partially reacted monomer mixtures of the invention and by admixture of fillers like silica gel or quartz powder, this effect of the polyaddition causing volume contraction may be still more reduced. In certain cases, casting or hot-pressing of the completely reacted thermoplastic polyadducts is able to reduce this change of volume down to the size of the thermal expansion of the polymers, a very desirable solution for various technical problems.

EXAMPLES OF THE INVENTION

Example 1

34.040 g crystalline 2,2-bis(4-glycidyloxyphenyl) propane (DDGE), melting at 42.5° to 43° C., are melted in a closable gastight, flat-bottomed flask. After cooling, 24.034 g N,N'-dibenzylethylenediamine, BP$_{0.08}$ 156°–157° C., n$_D^{20}$=1.5652, are added. The mixture is stirred in an inert atmosphere, becoming fluid and homogeneous. Subsequently, the mixture is degassed in vacuo, again exposed to an inert gas and kept 72 hours at 80° C.

A colorless glassy solid polyadduct is obtained. T$_g$ (DSC-1, Perkin-Elmer) is 51° C.

It dissolves in THF, pyridine, toluene/cyclohexanone, chloroform/methanol. The relative molecular weight is found by vapor pressure to be 16,200 (chloroform/methanol=4/1). The limiting viscosity value (25° C., chloroform/methanol=4/1) is [n]=41.4 (in ml. g.$^{-1}$).

The following elemental analysis was obtained after dissolving the polyadduct in toluene/cyclohexanone (4/1) and precipitation with petrol ether and drying of the colorless powder at 50° C.: Calculated: C, 76.52%; H, 7.64%; N, 4.82%. Found: C, 76.28%; H, 7.93%; N, 4.48%.

Films and lacquer-like coatings were prepared from solutions of the polyadduct. The polyadduct softens at 80° C. yielding a highly viscous mass, which may be fabricated according to known methods into films, rods and other shapes.

If, after mixing and degassing, the polyreaction is carried out in a shaping vessel, for instance in a hollow Teflon cylinder, a round rod is obtained having good mechanical properties.

Example 2

N,N'-dibenzyl-hexamethylenediamine-1,6,BP$_{0.2}$ 189°–193° C.; MP: 30.5° C.; n$_D^{20}$=1.5452, is prepared from bis(benzylidene)-hexamethylenediamine-1,6 by reduction with sodium borohydride in ethanol as a solvent. The diamine is obtained, after repeated distillation, as a colorless oily liquid, which is homogeneous as proven by TLC (DC upon Silufol, flowing fluid ethanol/isobutylacetate/25% hydrous ammonia=10/10/3).

Analysis: C$_{20}$H$_{28}$N$_2$ (296.5). Calculated: C, 81.03%; H, 9.52%; N, 9.45%. Found: C, 81.15%; H, 9.82%; N, 9.56%.

10.700 g. crystalline 2,2-bis(4-glycidyloxyphenyl)propane, MP=42.5° to 43° C., colorless crystals, are mixed with 9.118 g N,N'-dibenzyl-hexamethylenediamine-1,6 and kept at room temperature for 24 hours, and then maintained for 120 hours at 60° C. After 24 hours, a relative molecular weight of 6500 is obtained, which rises to about 12,000 within 100 hours.

The product is a colorless, glassy solid material ($T_g=35°$ C.), which begins to flow above 60° without decomposition. The polyadduct is soluble in chloroform/methanol. Well adhering films can be cast from this solution. The polyadduct may be shaped thermoplastically.

Example 3

N,N'-dibenzyl-3,6-dioxa-octanediamine-1-8, $BP_{0.1}=207°$ to 210° C., $n_D^{20}=1.5406$, is prepared from 1,8-dichloro-3,6-dioxa-octane by reaction with benzylamine. For that purpose, 1 mole (187.1 g) 1,8-dichloro-3,6-dioxa-octane are added dropwise while stirring during one hour to 10 moles (1071.5 g) benzylamine. The mixture is heated for one hour at 140° C. and further for 3 hours at 90° C. After cooling, 4 moles (224 g) KOH are added as an aqueous 25% solution. The mixture is shaken vigorously in a separatory funnel. After the separation of the phases, the upper layer is separated, dried above solid potassium hydroxide and distilled in vacuo. Excess benzylamine is distilled off and the remaining liquid is fractionated. The diamine is colorless liquid, which is homogeneous as proven by TLC (DC upon Silufol, flowing fluid ethanol-/isobutylacetate/25% aqueous ammonia=10/10/3); yield: 50%.

$C_{20}H_{28}N_2O_2$ (328.5). Calculated: C, 73.13%; H, 8.59%; N, 8.53%. Found: C, 73.14; H, 8.72%; N, 8.40%. Dihydrochloride: MP 189.5° to 190° C.

$C_{20}H_{30}N_2O_2Cl_2$ (401.4). Calculated: C, 59.85%; H, 7.53%; N, 6.98%; Cl, 17.67%. Found: C, 60.02%; H, 7.75%; N, 6.77%; Cl 17,30%.

10.000 g crystalline 2,2-bis(4-diglycidyloxyphenyl)propane, MP=42.5° to 43° C., are mixed, as in example 1, with 9.439 g N,N'-dibenzyl-3,6-dioxa-octanediamine-1,8, and allowed to stand for 24 hours at room temperature and then heated for 120 hours at 60° C. A faintly yellow glassy material results (relative molecular weight=10,000, $T_G=14°$ C.) which begins to flow above 45° C. without decomposition. The polyadduct is soluble in chloroform/methanol. Well adhering films may be poured from such solutions. The polyadduct may be shaped by known methods.

Example 4

N,N'-dibenzyl-p-xylylenediamine ($BP_{0.2}=130°$ C., MP=53° C., $n_D^{60}=1.5800$) is prepared from p-xylylene-dichloride by reaction with benzylamine. For that purpose, 1 mole (175.0 g) p-xylylenedichloride is added during one hour drop-wise with stirring to 10 moles (1071.5 g) benzylamine and kept for 2 hours at 150° C. After cooling, 4 moles (224 g) potassium hydroxide are added as a 25% aqueous solution. Two phases form; the upper is removed from a separatory funnel and dried with potassium hydroxide until it becomes a clear liquid. The liquid is distilled in vacuo while protected by nitrogen. At 68° C. and 10 Torr benzylamine distills off, and, at 130° C., 0.2 Torr, the diamine distills off.

The diamine, a pale yellow oily liquid, is separated and crystallizes on standing as colorless crystals. It is identified by TLC as a homogeneous substance (DC upon Silufol, flowing fluid ethanol-/isobutylacetate/25% aqeous ammonia 7/10/2); yield: 71%.

$C_{22}H_{24}N_2$ (316.4). Calculated: C, 83.50%; H, 7.64%; N, 8.85%. Found: C, 84.12%; H, 7.88%; N, 8.73%.

19.439 g crystalline 2,2'bis(4-glycidyloxyphenyl) propane (mp=42.5° to 43° C., colorless crystals) are, as described in example 1, heated for 50 hours at 80° C. with 17.674 g N,N-dibenzyl-p-xylylene-diamine. A polyadduct (rel. molecular weight=10,000, yellowish, glassy, $T_G=57°$ C.) is obtained, which begins to flow above 100° C. without decomposing. Solutions of the polyadduct yield well adhering films. The polyadduct may be shaped using methods known in the plastics industry.

Example 5

4,4'-bis(N-benzylamino)-diphenylmethane (MP=115° C.) is prepared by reacting 4,4'diamino-diphenylmethane with benzyl-alcohol and potassium hydroxide at 270° C. After recrystallization in ethanol, the diamine occurs as a colorless crystalline product which is homogeneous as found by TLC (DC upon Silufol, flowing fluid ethanol, isobutylacetate, 25% aqueous ammonia 7/10/2).

$C_{27}H_{26}N_2$ (378.5). Calculated: C, 85.67%; H, 6.92%; N, 7.41%. Found: C, 85.86%; H, 6.98%; N, 7.40%.

10.508 g. crystalline 2,2'-bis(4-glycidyloxyphenyl)propane (MP=42.5° to 43° C., colorless crystals) are heated for 50 hours at 105° C. with 11.675 g 4,4'-bis(N-benzylamino)-diphenylmethane. After 20 hours, a relative molecular weight of 5000 is obtained, which rises after another 30 hours to about 10,000.

A yellow brown glassy solid ($T_G=95°$ C.) is obtained, which begins to flow without decomposing above 120° C.

The polyadduct is soluble in chloroform/methanol. These solutions yield well adhering films. The polyadduct may be shaped like well known thermoplastic polymers.

EXAMPLE 6

N,N'-dibenzyl-2,2,4(2,4,4)-trimethylhexamethylenediamine-1,6 ($BP_{0.15}=200°$ C.) is prepared by the reaction of 2,2,4(2,4,4)-trimethylhexamethylenediamine-1,6 with benzaldehyde and subsequent reduction with $NaBH_4$, as in Example 2.

$C_{23}H_{34}N_2$ (338.5). Calculated: C, 81.60%; H, 10.12%; N, 8.28%. Found: C, 81.72%; H, 10.19%; N, 8.29%.

10,000 g crystalline 2,2'-bis(4-glycidyloxyphenyl)propane were, as described in Example 1, heated for 72 hours at 60° C. with 9.898 g N,N'-dibenzyl-2,2,4(2,4,4)-trimethylhexamethylenediamine-1,6. A soluble, thermoplastically shapeable polyadduct is formed ($T_g=36°$ C., rel. molecular weight: 8200).

What is claimed is:

1. Process for the preparation of high molecular thermoplastic epoxide-amine-polyadducts by the reaction of diepoxides with disecondary diamines in a molar ratio of about 1:1, wherein a diepoxide is reacted with a disecondary diamine, having the structure

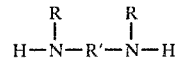

where R denotes an aralkyl radical, R' denotes a difunctional radical selected from the group consisting of alkylenes, cycloalkylenes, arylenes, difunctional heterocycles and alpylene, cycloalpylene, and arylene radicals interrupted by heteroatoms, in the absence of solvents or diluents.

2. A process according to claim 1, wherein said molar ratio is between 0.95:1.0 and 1.0:1.05.

3. A process according to claim 1, wherein mixtures of diamines and mixtures of diepoxides are caused to interact.

4. A process according to claim 1, wherein the reaction is conducted in a form-shaping mold thereby to prepare a shaped object.

5. A process according to claim 1, wherein the reaction is conducted on a surface to be coated thereby to form a surface coating.

6. A process according to claim 1, wherein the reaction is conducted between parts to be bonded thereby to form an adhesive bond between the parts.

7. A process according to claim 1, wherein the reaction is conducted between parts to be sealed together by a gasket thereby to form the gasket and seal the parts together therewith.

8. A process according to claim 1, wherein said diepoxide is 2,2-bis(4-glycidyloxyphenyl)propane.

9. A process according to claim 1, wherein said heteroatoms are selected from the group consisting of oxygen, sulfur and nitrogen.

10. A process according to claim 1, wherein said diamine is selected from the group consisting of N,N-dibenzylethylenediamine, N,N'-dibenzylhexamethylenediamine-1,6, N,N'-dibenzyl-3,6-dioxaoctanediamine, N,N'-dibenzyl-p-xylylenediamine, 4,4'-bis(N-benzylamino)diphenylmethane and N,N'-dibenzyl-2,2,4(2,4,4)-trimethylhexamethylenediamine-1,6.

11. A process according to claim 1, wherein the reaction is continued until the molecular weight of the product is above 8000.

12. A process according to claim 1, wherein the reaction temperature is 20°-200° C.

* * * * *